US011148468B1

(12) United States Patent
Ballena (10) Patent No.: US 11,148,468 B1
(45) Date of Patent: Oct. 19, 2021

(54) NON-PNEUMATIC TIRE WITH INDIVIDUAL TIRE MODULES

(71) Applicant: Abraham Ballena, Coquitlam (CA)

(72) Inventor: Abraham Ballena, Coquitlam (CA)

( * ) Notice: Subject to any disclaimer, the term of this patent is extended or adjusted under 35 U.S.C. 154(b) by 0 days.

(21) Appl. No.: 17/306,142

(22) Filed: May 3, 2021

(51) Int. Cl.
  *B60C 7/08* (2006.01)
  *B60C 7/26* (2006.01)
  *B60C 7/10* (2006.01)

(52) U.S. Cl.
  CPC .............. *B60C 7/08* (2013.01); *B60C 7/10* (2013.01); *B60C 7/26* (2013.01)

(58) Field of Classification Search
  CPC .............. B60C 7/08; B60C 7/10; B60C 7/26
  See application file for complete search history.

(56) References Cited

U.S. PATENT DOCUMENTS

| | | |
|---|---|---|
| 1,635,194 A | 7/1927 | Shively |
| 1,702,081 A | 2/1929 | Hatfield |
| 2,322,454 A | 6/1943 | Keough |
| 2,436,844 A | 3/1948 | Wells |
| 3,018,809 A | 1/1962 | Bernard |
| 4,235,270 A | 11/1980 | Kahaner et al. |
| 5,494,090 A | 2/1996 | Kejha |
| 6,681,822 B2 | 1/2004 | Adams et al. |
| 7,013,939 B2 | 3/2006 | Rhyne et al. |
| 7,201,194 B2 | 4/2007 | Rhyne et al. |
| 7,523,773 B2 | 4/2009 | Gabrys et al. |
| 10,179,476 B2 | 1/2019 | Solheim et al. |
| 2002/0096237 A1 | 7/2002 | Burhoe et al. |
| 2004/0069385 A1 | 4/2004 | Timoney et al. |
| 2005/0133133 A1 | 6/2005 | Becker et al. |
| 2010/0078111 A1 | 4/2010 | Anderson et al. |
| 2010/0200131 A1 | 8/2010 | Iwase et al. |
| 2012/0067481 A1 | 3/2012 | Cron |
| 2012/0234445 A1 | 9/2012 | Manesh et al. |
| 2012/0241531 A1* | 9/2012 | Werner .................. B60C 7/08 239/1 |
| 2013/0026813 A1* | 1/2013 | MacPherson ............ B60C 7/08 301/31 |

(Continued)

FOREIGN PATENT DOCUMENTS

CN 202180713 U * 4/2012
CN 105946466 A * 9/2016

(Continued)

*Primary Examiner* — Kip T Kotter
(74) *Attorney, Agent, or Firm* — Diament Patent Law, P.C.; Adam Diament (57) ABSTRACT

A non-pneumatic tire having a plurality of individual modules is mounted on a wheel having with a plurality of depressed module mounting slots to form a wheel and tire assembly. Each module has a body with an opening in the middle that separates the upper region from the lower region. The lower region has an attachment hole for attaching the module to the mounting slot. The lower region of the module and the mounting slot are shaped accordingly to fit each other. The module has two arms, each having an interlocking face disposed at their ends. A full set of interconnected modules forms a complete annular tire. The wheel includes a plurality of depressed mounting slots with a wheel attachment hole disposed around the rim where the modules can be mounted. The rim includes flanges that bound the mounting slot on both sides preventing the modules from sliding sideways.

6 Claims, 6 Drawing Sheets

(56) References Cited

U.S. PATENT DOCUMENTS

| | | |
|---|---|---|
| 2013/0167990 A1 | 7/2013 | Bae |
| 2013/0192734 A1 * | 8/2013 | Seljan .................. B60C 7/08 |
| | | 152/306 |
| 2013/0240272 A1 | 9/2013 | Gass et al. |
| 2014/0125113 A1 * | 5/2014 | MacPherson ............ B60C 7/12 |
| | | 301/43 |
| 2014/0238561 A1 | 8/2014 | Choi et al. |
| 2015/0083295 A1 * | 3/2015 | Resa Rodrigo .......... B60C 7/08 |
| | | 152/306 |
| 2015/0251493 A1 * | 9/2015 | Ma ........................ B60B 9/04 |
| | | 152/80 |
| 2016/0214435 A1 | 7/2016 | Schaedler et al. |
| 2016/0250893 A1 | 9/2016 | Shoji et al. |
| 2017/0120671 A1 | 5/2017 | Miles et al. |

FOREIGN PATENT DOCUMENTS

| | | | | |
|---|---|---|---|---|
| DE | 2532829 A1 * | 1/1977 | ............. | B60C 27/16 |
| GB | 2442811 A * | 4/2008 | ............... | B60C 7/08 |
| JP | 2007238019 A | 9/2007 | | |
| WO | 1996022891 A1 | 8/1996 | | |
| WO | 2016105933 A1 | 6/2016 | | |
| WO | 2016126983 A1 | 8/2016 | | |

\* cited by examiner

NON-PNEUMATIC TIRE WITH INDIVIDUAL TIRE MODULES

CROSS-REFERENCE TO RELATED APPLICATIONS

None.

FIELD OF THE DISCLOSURE

The present invention relates to tires, and more specifically, to non-pneumatic tires.

BACKGROUND OF THE INVENTION

Pneumatic tires, or air-filled tires, are made of an airtight inner core filled with pressurized air. A tread, usually reinforced with steel belting or other materials, covers this inner core and provides the contact area with the road. Pneumatic tires have the ability to absorb the unevenness of terrain allowing for smoother ride with less bumping and shaking. Pneumatic tires are the predominant tires being used today.

Non-pneumatic tires, or airless tires, are not supported by air pressure. They are not susceptible to blowout, because even if punctured, since there is no air in the tire, the tire does not become flat. These tires require much less maintenance. They are designed to absorb and cushion the impact and pressure from a vehicle without air using various types of designs and materials.

Pneumatic tires may be more dangerous than non-pneumatic tries because pneumatic tires are susceptible to puncture, which could result in total failure. A blowout at high speed can lead to a dangerous car accident. Repairing and replacing a damaged pneumatic tire is tedious, time consuming and requires certain skills for person doing the job.

Currently, some non-pneumatic tires are strongly attached to the wheel during the manufacturing processes, and when damaged, requires special equipment and certain skills for the person doing the repair. Other pneumatic tires have special methods of mounting the tire to the wheel, and fixing such damaged tire are difficult to perform on the road.

Several types of non-pneumatic tire have been proposed with separate elements that form an annular tire. For example, in U.S. Pat. No. 1,702,081A to Hatfield the following disadvantages can be observed. First, there is no firm and stable mounting on the wheel for the pad. The pad sits atop the wheel fastened at the wheel sections with fastening members such as bolt. The fastening member such as a bolt is likely to protrude on the side due to aperture placement, making it vulnerable to side impact. Furthermore, the pad has no interconnection feature with other pads making it susceptible to misalignment.

Another example is U.S. Pat. No. 2,436,844A to Wells. The following disadvantages can be observed. First, there is no firm and stable mounting on the rim. Second, the spring with tread is held by a rivet fastened at one side of the rim in alternating fashion. The spring with tread has no interconnection feature with other elements. In view of the above aspects in both examples, structural arrangement is weak, unstable, and more likely to fail when subjected to continuous impact and pressure from a moving vehicle. Disadvantages become more apparent when applied to large vehicles and driving on uneven terrain.

Therefore, there remains a continuing need for improved non-pneumatic tires.

BRIEF SUMMARY OF THE PRESENT INVENTION

Accordingly, embodiments relate to a non-pneumatic tire having individual modules, a wheel and tire assembly, and a method of assembling and disassembling a non-pneumatic tire.

In one embodiment there is a plurality of interlocking tire modules for mounting on a wheel. Each of the plurality of tire modules has a module body, a module upper region and a module lower region. The module lower region is sized and shaped to fit within a module mounting slot. The plurality of interlocking tire modules are designed to interlock with each other. The embodiment may further comprise a wheel, wherein the plurality of interlocking tire modules are connected to the wheel, thereby forming a wheel and tire assembly. In one embodiment the module body has an opening between the module upper region and the module lower region. In one embodiment module upper region is curved and the module lower region is curved, and wherein the module lower region has a module attachment hole. In one embodiment each of the plurality of interlocking tire modules has a first module arm a second module arm. In one embodiment the plurality of individual tire modules are connected together to form an annular tire. In one embodiment, each of the individual tire modules have a tread for contacting a road. In one embodiment, individual tire modules are comprised of an elastomer. In one embodiment each of the tire modules are reinforced with at least one of a metal, a wire, and a glass fiber. In one embodiment each of the tire modules has a male interlocking face and a female interlocking face. In one embodiment, there is a bolt positioned through the module lower region for securing the tire module to the wheel, and wherein each of the tire modules has a retaining plate slot, the retaining plate slot for placement of a retaining plate to retain the bolt, to the tire module. In one embodiment, the plurality of interlocking tire modules are at least four interlocking tire modules adjacent to each other, and the male interlocking face is in cooperation with the female interlocking face of an adjacent interlocking tire module.

In yet another embodiment there is a wheel and tire assembly. The tire is made of the nonpneumatic tire described above and includes a wheel forming a base for mounting the interlocking tire modules. The wheel has a plurality of module mounting slots, the plurality of module mounting slots have a curved surface sized and are shaped complementary to a curvature of the module lower region. The plurality of interlocking tire modules are at least four interlocking tire modules. In one embodiment, the plurality of module mounting slots are bounded by rim flanges. In one embodiment, the wheel has a wheel attachment hole within each of the plurality of module mounting slots. Each of the interlocking tire modules has a module attachment hole, The wheel attachment hole and the module attachment hole are aligned to allow a bolt to secure each of the plurality of interlocking tire modules to the wheel. In one embodiment each of the interlocking tire modules has a male interlock face and a female interlock face to secure at least one of the interlocking tire modules to another interlocking tire module.

In yet another embodiment is a method to assemble a tire, or a method to disassemble a tire to replace at least one of the damaged modules. The method includes the steps of placing at least one of the plurality of interlocking tire modules described above on the wheel. The wheel has a plurality of module mounting slots sized and shaped to fit the module lower region. The user mounts at least one of the plurality of interlocking tire modules to the wheel and interlocks at least one of the interlocking tire modules to a second (adjacent) interlocking tire module. To disassemble the tire, the user first removes one of the interlocking tire modules from the wheel. The modules may have any of the features described above or below in the detailed description.

Wherefore, there are several advantages of the embodiments. The wheel has firm and stable mounting slots bounded on both sides by flanges. Attachment holes between modules and the wheel are inside their inner structure keeping attachment elements away from side impact and possible failure. Modules are interconnected with interlocking features which makes connection with adjacent modules firm and stable. Modules can be easily and quickly replaced. Advantages become more apparent when applied to large vehicles that require a much stronger and more stable structure.

Other advantages of the embodiments will be apparent from a consideration of the drawings and ensuing descriptions.

DETAILED DESCRIPTION OF EMBODIMENTS

The embodiments now will be described more fully hereinafter with reference to the accompanying drawings, in which embodiments of the invention are shown. The invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be understood that the term "each of the plurality of interlocking tire modules" does not necessarily mean "each and every of the plurality of interlocking tire modules" but is defined one, two, three, four, more, or all of the individual interlocking tire modules that make up the plurality of interlocking tire modules.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments should not be construed as limited to the particular shapes of regions illustrated herein but are to include deviations in shapes that result, for example, from manufacturing. The embodiments illustratively disclosed herein suitably may be practiced in the absence of any elements that are not specifically disclosed herein.

Figure 1:
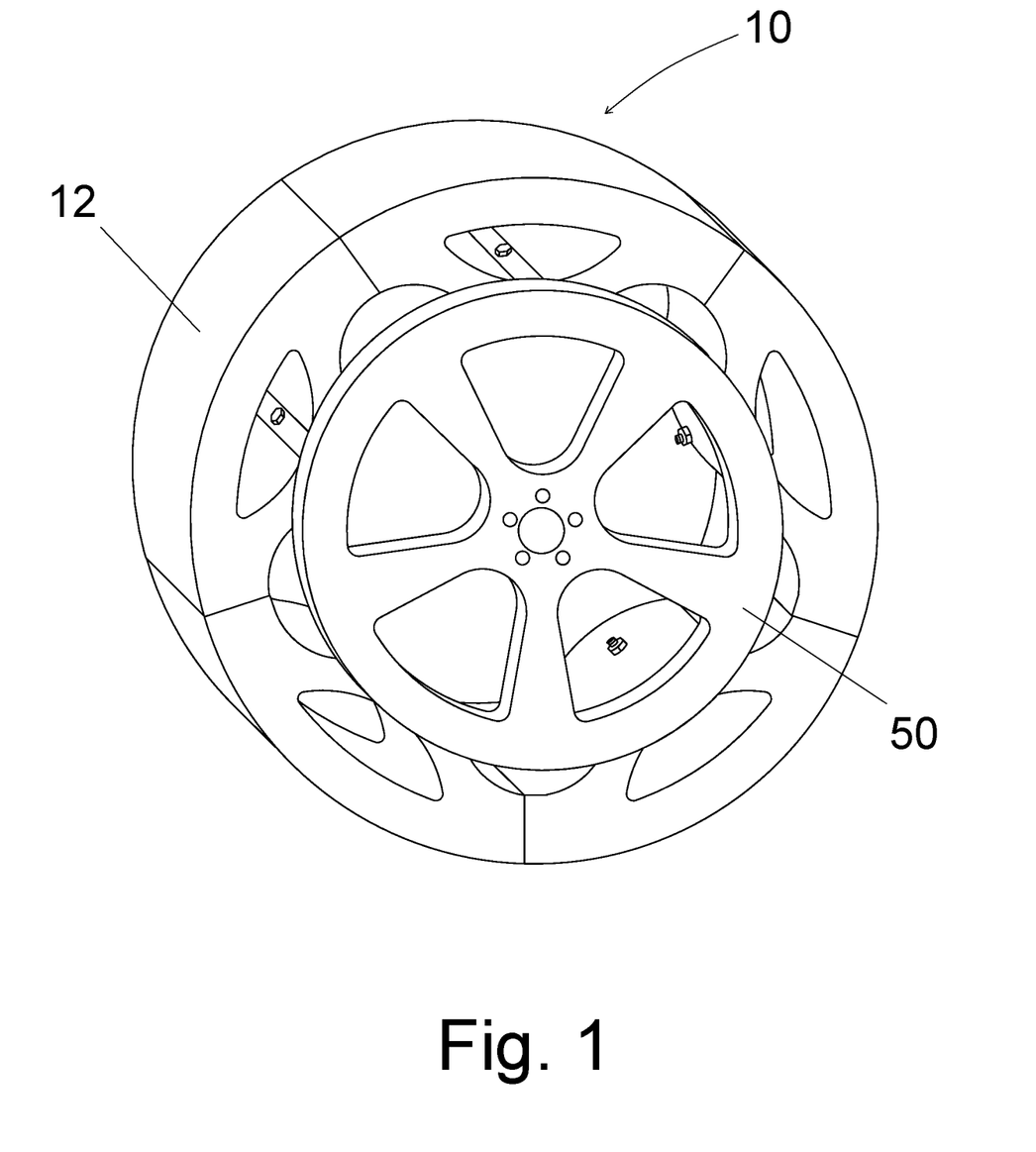
FIG. 1 shows a perspective view of a complete wheel and tire assembly in accordance with the embodiment.

Turning to the Figures, FIG. 1 shows the embodiment in perspective view of a complete wheel and tire assembly 10 having a non-pneumatic tire. A full set of interlocking tire modules 12 when interconnected together and mounted on a wheel 50 formed a complete wheel and tire assembly 10.

Figure 2:
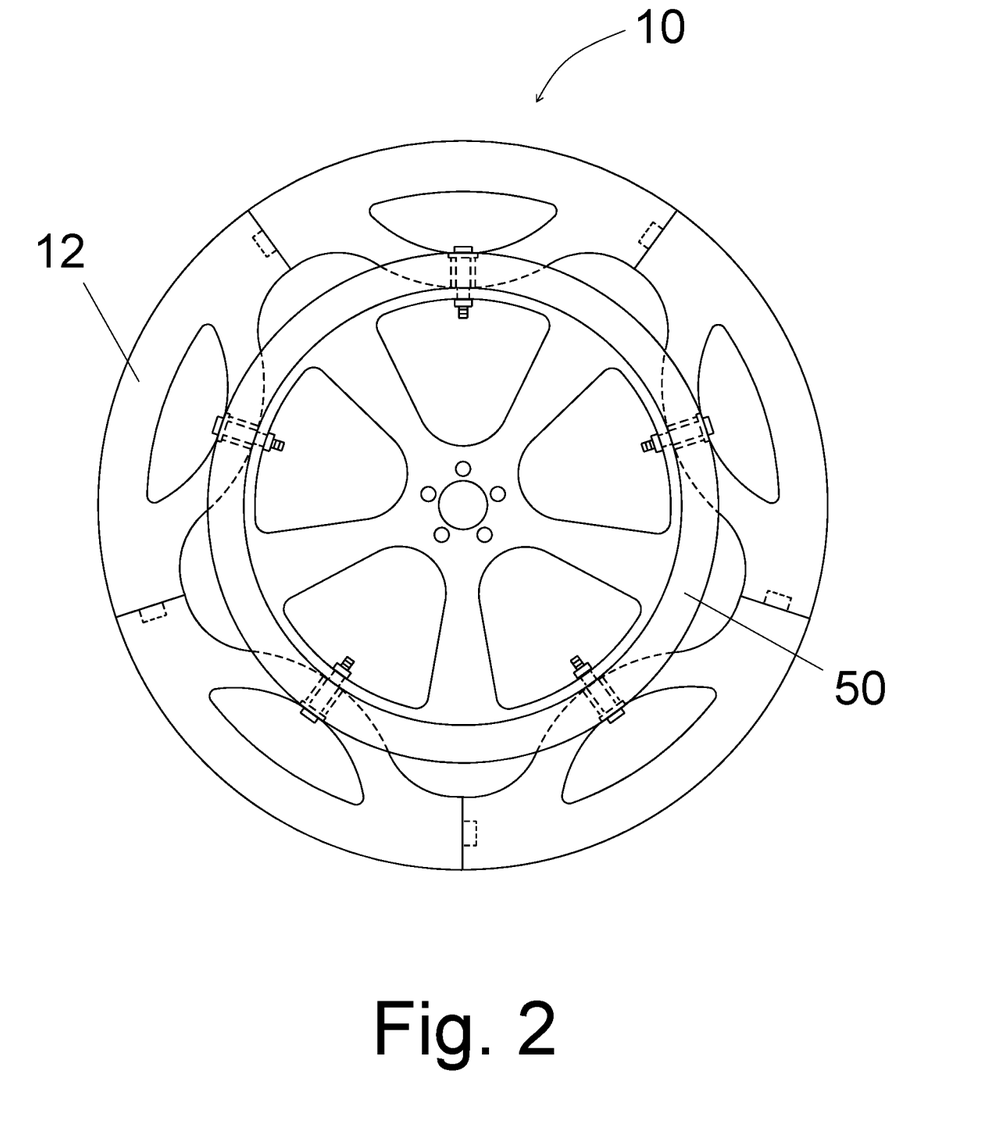
FIG. 2 shows a side view of a complete wheel and tire assembly in accordance with the embodiment.

FIG. 2 shows the same embodiment of FIG. 1 in side view.

Figure 3:
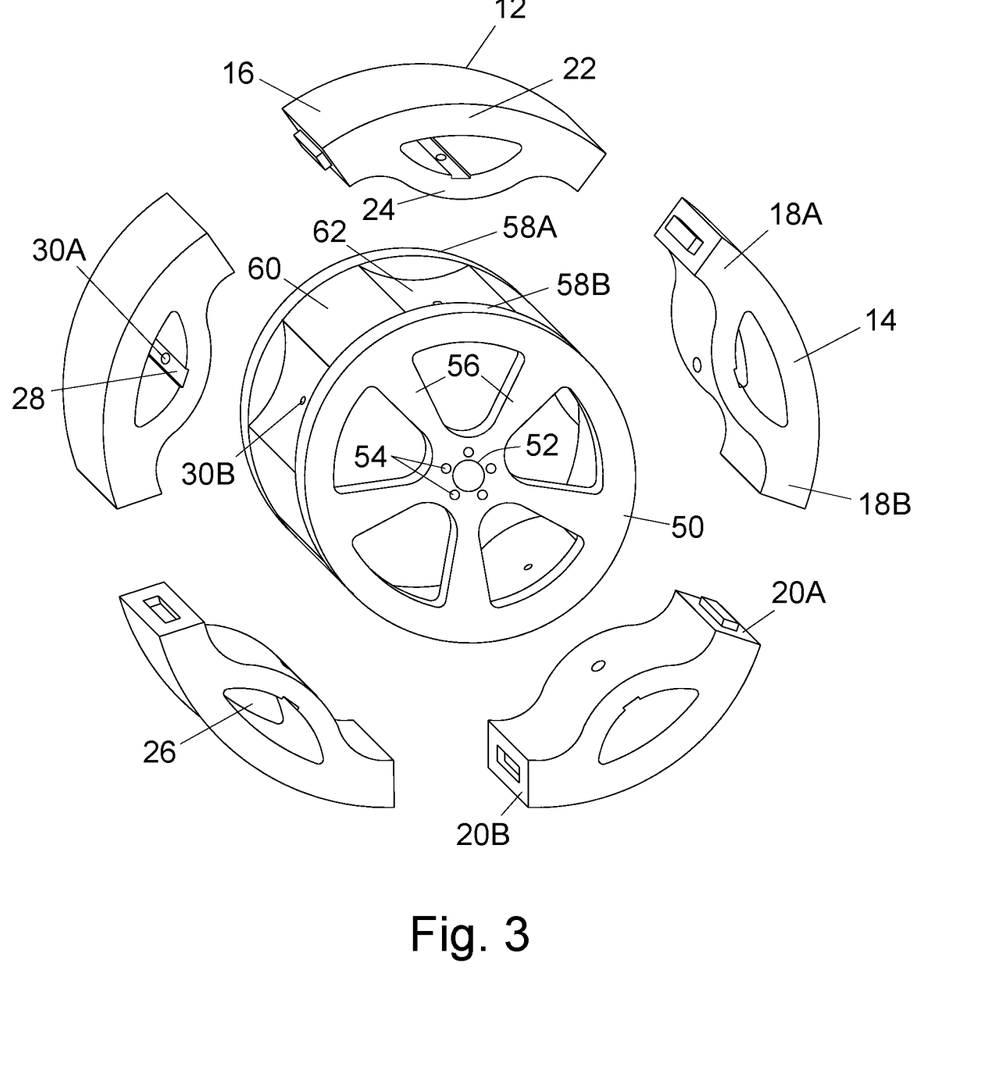
FIG. 3 shows an exploded perspective view of parts of a wheel and tire assembly in accordance with the embodiment.

FIG. 3 shows a plurality of tire modules 12, each of the tire modules 12 having a module body 14 and a module opening 26 in the middle of the module body 14. The module opening 26 separates the module upper region 22 from the module lower region 24. The opening 26 can be of various shapes having the same purpose. Each module 12 includes two arms 18A and 18B, one on each side of the module 12. One arm 18A has male interlocking face 20A and the other arm 18B has female interlocking face 20B which interlock with adjacent modules 12. The interlocking face 20A and 20B can be of various styles and configurations with the same purpose. The module upper region 22 formed an upward arch or curvature and the lower region 24 has an inverted arch or is curved (that is, with respect to the upper region 22 arc) having a module attachment hole 30A for mounting the module 12 to a wheel 50. A series of arches formed by the module upper region 22 and arches between interlocking arms 18A and 18B provides resiliency to the entire annular tire which significantly cushions the impact and pressure from a moving vehicle, thereby creating a smoother ride. The module 12 includes a retaining plate slot 28 for mounting or retaining the retainer plate 34 shown in FIG. 4 and FIG. 5. The module 12 includes tread 16 that is for contacting a road. The module 12 can be made of elastomer, Kevlar, or other suitable materials. In one embodiment the modules 12 can made from a porous structure of strong materials such as carbon fiber that can make a module lighter, stronger, and last longer, but also may be made of typical tire materials known in the art, such as rubber.

FIG. 3 shows a wheel 50 with a plurality of module mounting slots 62 disposed around its rim 60 for mounting the modules 12. The module mounting slot 62 and the module 12 lower region 24 are shaped complementary to fit each other (and in the embodiment show, they have curved surfaces). The wheel 50 includes two rim flanges 58A and 58B that bound the mounting slot 62 on each of its sides to prevent the modules 12 from moving sideways and off of the wheel 50. The wheel includes spokes 56, lug holes 54, and a hub 52 for connecting and securing the wheel to the axle of the car.

Figure 4:
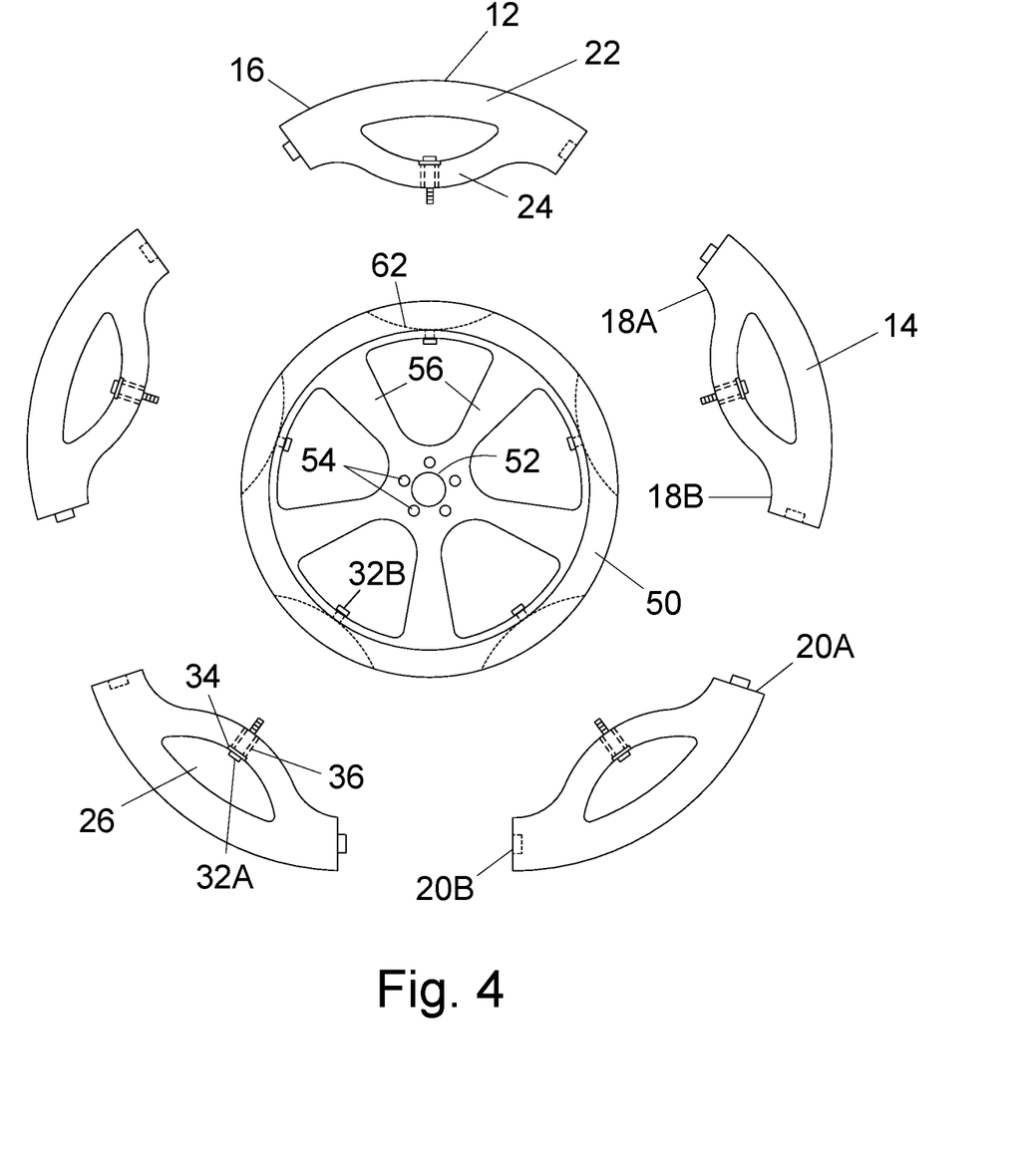
FIG. 4 shows an exploded side view of parts of a wheel and tire assembly in accordance with the embodiment.

FIG. 4 is an side view of the embodiment of FIG. 3. As can be seen in the embodiments, there are five individual interlocking tire modules 12. However, one can imagine fewer or more modules. In some embodiments there may be at least two, at least three, at least four, at least five, at least six, or at least seven or more individual interlocking tire modules to make up the plurality of interlocking tire modules.

Figure 5:
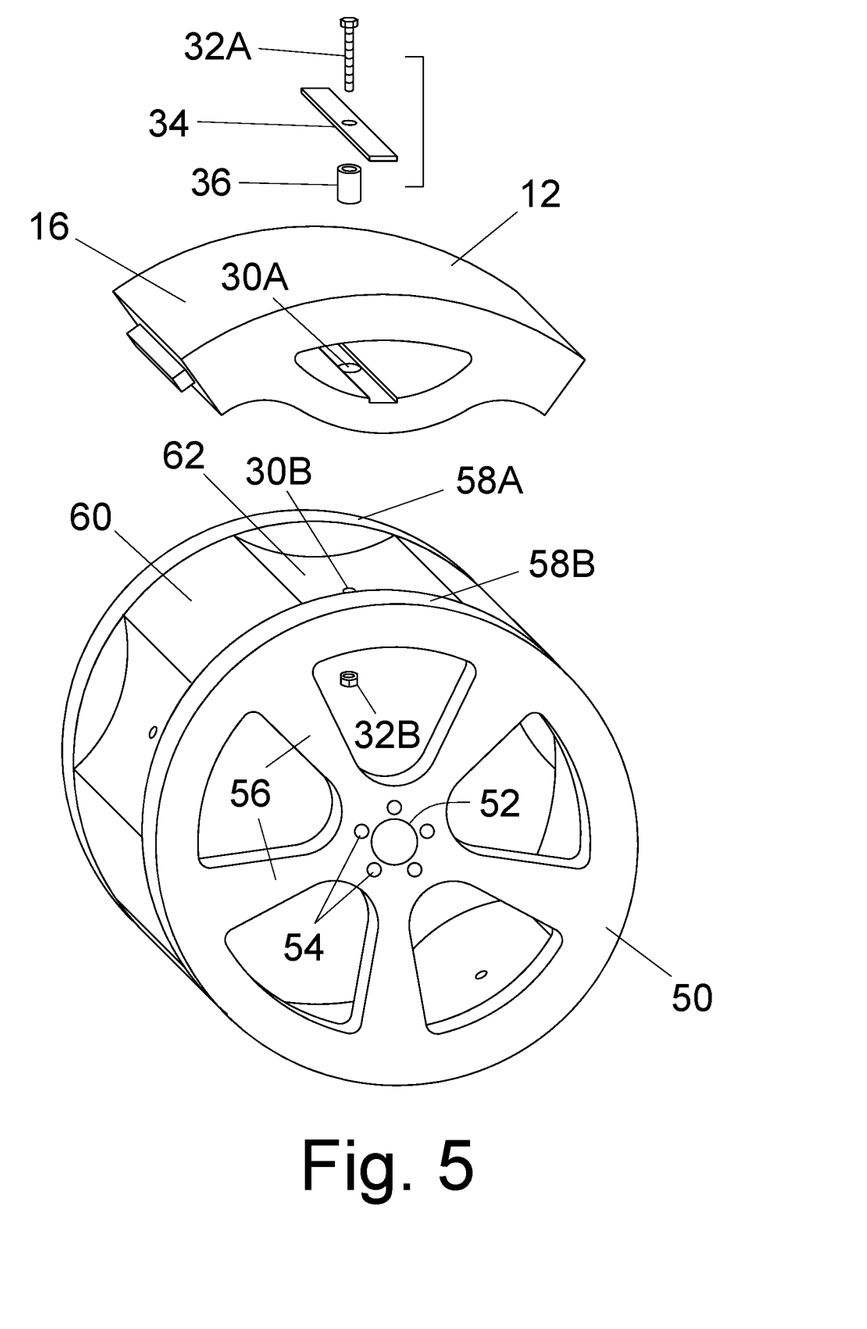
FIG. 5 shows an exploded perspective view of a wheel and one tire module with their attachment elements in accordance with the embodiment.

FIG. 4 and FIG. 5 also show attachment elements that includes bolt 32A, nut 32B, retaining plate 34, and spacer 36 that attach the module 12 to the wheel 50. Attaching the module 12 to the wheel 50 can use various securing elements known by those having skill in the art without detracting from the spirit of the invention. The modules 12 are secured to the wheel 50 via a bolt 32A that goes through the module attachment hole 30A and connects to an aligned wheel attachment hole 30B, where it is aligned.

FIG. 5 shows an exploded perspective view of one module 12 of the embodiment with the wheel 50. The nut 32B may be built within the wheel, and the retaining plate 34 and spacer 36 built with the module 12 thereby making attachment easier and lessen the chance of misplacing or losing any element.

Figure 6A:
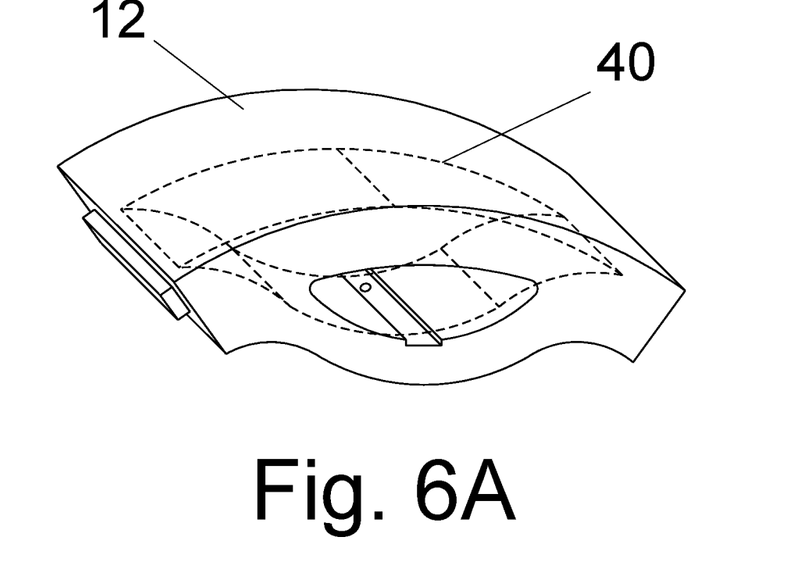
FIG. 6A shows a side view of a tire module with embedded reinforcing element in accordance with the embodiment.
Figure 6B:
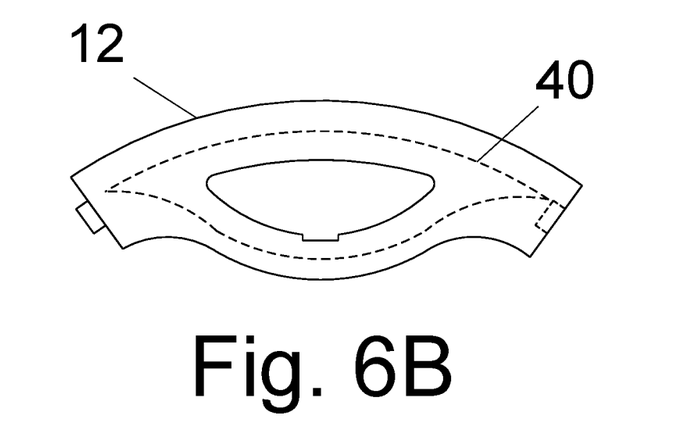
FIG. 6B shows an orthogonal view of a tire module with embedded reinforcing element in accordance with the embodiment.

FIG. 6A shows a perspective view of a module 12 with a reinforcing element 40 embedded within its body and FIG. 6B shows an orthogonal view of the same module 12 of FIG. 6A. Embedded reinforcing elements 40 can be made of a wire such as a steel wire, glass fiber or other suitable materials.

Method of Installing/Assembling Modules on the Wheel

A user may mount the modules 12 one by one on the mounting slots 62 by guiding the module arms 18A and 18B to lock properly with adjacent modules 12. The user installs all attachment elements such as the spacer 36, retaining plate 34, bolt 32A and nut 32B, and then tightens the bolt gradually while ensuring arms 18A and 18B remain locked with the adjacent modules 12, and continues to tighten the module 12 to the wheel 50, which subsequently also secures the interlocking faces 20A, 20B of adjacent modules 12, together.

Method of Fixing a Damaged Module of a Disabled Vehicle (Disassembling and Assembling)

When one of the modules 12 is damaged, the user moves first moves the vehicle to a position where the damaged module 12 is exposed and not underneath the wheel 50. The user secures the vehicle so it will not move. The user then removes the damaged module 12 by removing its attachment elements; bolt 32A, nut 32B, retaining plate 34, and spacer 36, which facilitates removal of the damaged module 12. The user can then insert a new module 12 in place of the damaged module, guiding its arms 18A and 18B to lock properly with adjacent modules. The user then installs all the attachment elements to secure the module 12 to the wheel 50 so that adjacent modules are in interlocking connecting with each other, and the user tightens them appropriately.

Accordingly, several advantages of the embodiment are as follows: One advantage is that replacing a damaged module is easier than replacing a whole tire. Another advantage is that replacing a damaged module is more economical than replacing a whole tire. Still another advantage is that handling an individual module is easier than handling a whole tire. Still another advantage is that an individual module is smaller and lighter than a whole tire. Still another advantage is that a quick fix of a damaged tire can make a disabled vehicle operational again in the shortest possible time, especially if safety is of utmost importance. Especially in the case large tires used by large vehicles and machineries, the advantages increase proportionately as large tires are much more expensive and much more difficult to handle because of their sizes. The present embodiments all for safely fixing damaged tires easily, economically, and in the shortest amount of time.

REFERENCE NUMERALS 10 wheel and tire assembly
12 interlocking tire module
14 module body
16 tread
18A module arm (first)
18B module arm (second)
20A male interlock face
20B female interlock face
22 module upper region
24 module lower region
26 module opening
28 retaining plate slot
30A module attachment hole
30B wheel attachment hole
32A bolt
32B nut
34 retaining plate
36 spacer
40 reinforcing element
50 wheel
52 wheel hub 54 lug holes
56 wheel spokes
58A rim flange (first side)
58B rim flange (second side)
60 rim
62 module mounting slot While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A wheel and non-pneumatic tire assembly comprising:
   a) a non-pneumatic tire having a plurality of interlocking tire modules, wherein each of the plurality of interlocking tire modules has a module body, a module upper region and a module lower region; and,
   b) a wheel forming a base for mounting the plurality of interlocking tire modules, the wheel having a plurality of module mounting slots, the plurality of module mounting slots having a curved surface sized and shaped complementary to a curvature of the module lower region,
   wherein the plurality of interlocking tire modules are at least four interlocking tire modules;
   wherein the plurality of interlocking tire modules are for mounting on the wheel;
   wherein the module lower region is sized and shaped to fit within the plurality of module mounting slots on the wheel, whereby the plurality of interlocking tire modules are designed to interlock with each other,
   wherein the wheel has a wheel attachment hole within each of the plurality of module mounting slots,
   wherein each of the interlocking tire modules has a module attachment hole, and,
   wherein the wheel attachment hole and the module attachment hole are aligned to allow a bolt to secure each of the plurality of interlocking tire modules to the wheel.

2. The wheel and tire assembly of claim 1, wherein the plurality of module mounting slots are bounded by rim flanges.

3. The wheel and tire assembly of claim 1, wherein the each of the plurality of interlocking tire modules has a male interlock face and a female interlock face to secure at least one of the interlocking tire modules to another interlocking tire module.

4. A method of assembling or disassembling a non-pneumatic tire on a wheel, the method comprising:
   a) placing at least one of the plurality of interlocking tire modules of claim 1 on the wheel of claim 1, wherein the wheel has the plurality of module mounting slots sized and shaped to fit the module lower region;
   b) mounting at least one of the plurality of interlocking tire modules to the wheel; and;
   c) interlocking at least one of the plurality of interlocking tire modules to another interlocking tire module.

5. The method of claim 4, further comprising the step of removing at least one of the plurality of interlocking tire modules from the wheel.

6. The method of claim 4,
   wherein the module body has a module opening between the module upper region and the module lower region,
   wherein the module upper region is curved and the module lower region is curved, and wherein the module lower region has the module attachment hole;
   wherein each of the plurality of interlocking tire modules has a first module arm a second module arm;
   wherein each of the plurality of interlocking tire modules are reinforced with at least one of metal, wire, and glass fiber;
   wherein each of the plurality of interlocking tire modules has a male interlocking face and a female interlocking face.

* * * * *